G. P. MOORE.
COASTER BRAKE.
APPLICATION FILED JAN. 3, 1910. RENEWED JULY 1, 1914.

1,113,367.

Patented Oct. 13, 1914.

WITNESSES
F. E. Potter.
H. M. Gorsline

INVENTOR:
Gales P. Moore

UNITED STATES PATENT OFFICE.

GALES P. MOORE, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

COASTER-BRAKE.

1,113,367.  Specification of Letters Patent.  Patented Oct. 13, 1914.

Application filed January 3, 1910, Serial No. 536,129. Renewed July 1, 1914. Serial No. 848,496.

*To all whom it may concern:*

Be it known that I, GALES P. MOORE, a citizen of the United States, residing at Bristol, county of Hartford, State of Connecticut, have invented a certain new and useful Coaster-Brake, of which the following is a full, clear, and exact description, such as will enable others skilled in the art to which it appertains to make and use the same, reference being had to the accompanying drawings, forming part of this specification.

My invention relates to coaster brakes, and more particularly to the brake mechanism used therein.

In coaster brakes as heretofore constructed, it has been customary to place the brake itself inside of the hub and to have said brake operate upon an interior surface of said hub. In some instances, however, (e. g., when, because of hardening or machining, it is difficult or unexpedient to operate upon the inner surface of the hub), it is desirable to have the brake operate upon the hub's outer surface.

One object of the present invention is to provide a structure in which the brake operates upon the hub's exterior.

A further object is to provide a coaster brake having an exterior brake whose action is simple but powerful and effective.

A further object is to provide a coaster brake having an exterior brake which is properly housed and protected although but few parts are necessitated for such purpose.

To these ends, and also to improve generally upon devices of the character indicated, my invention consists in the various matters hereinafter described and claimed.

Figure 1:
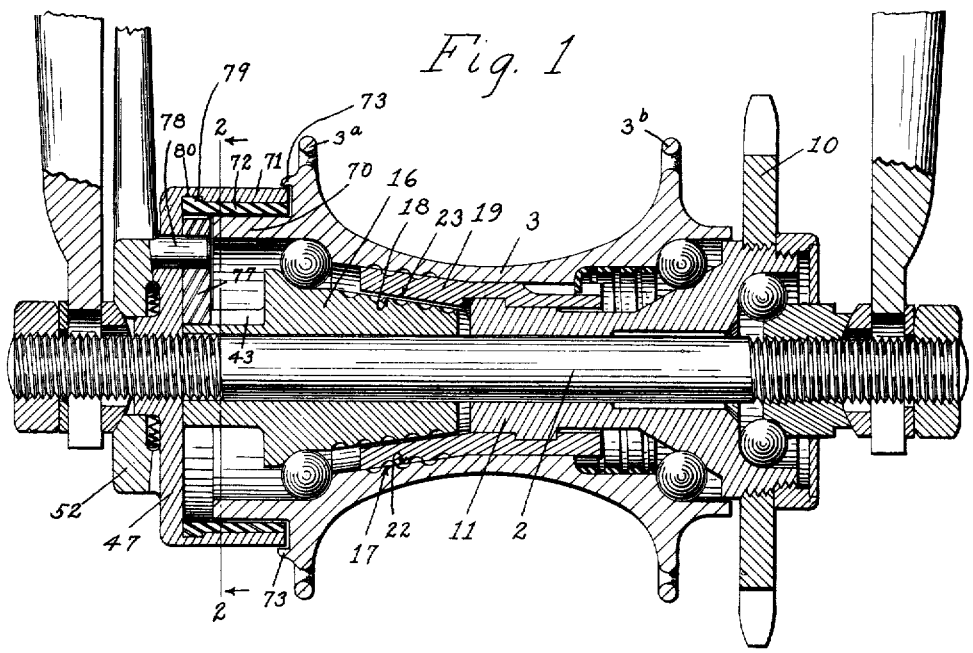
Figure 2:
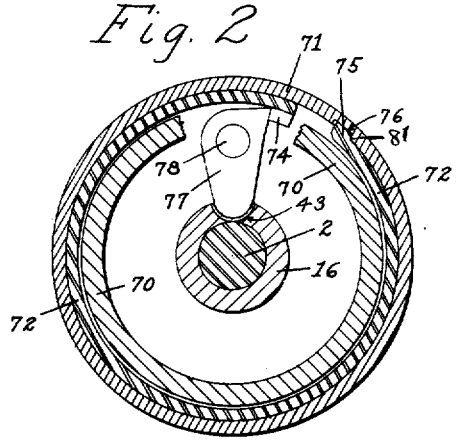
Figure 3:
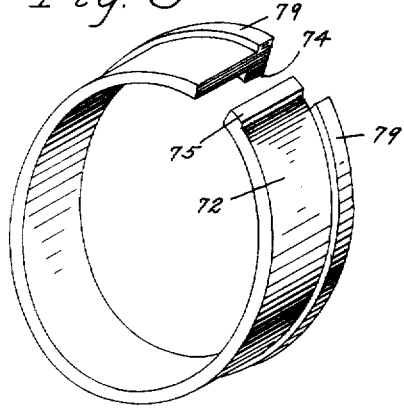

In the accompanying drawings, Figure 1 is a longitudinal sectional elevation of a coaster brake embodying my invention; Fig. 2 is a cross-sectional elevation on about the line 2—2 of Fig. 1, a portion of the hub being broken away; and Fig. 3 is a perspective view of the brake-ring.

Although in nowise limited to such application, I herein disclose my invention as applied to the general type of coaster brake disclosed by Patent No. 745524, granted December 1, 1903, to Albert F. Rockwell. Referring now more particularly to the present drawings and to said patent, 2 indicates the axle of the rear wheel which commonly embodies the coaster brake, said axle being adapted to be secured to the frame of a bicycle or the like, 3 is the hub of such rear wheel, said hub having the usual spoke flanges $3^a$ and $3^b$, 11 is the threaded driver-sleeve rotatably mounted upon said axle and carrying the usual sprocket wheel 10, 16 is the brake-actuator rockably mounted upon said axle and adapted to apply the brake when properly rocked backwardly, 19 is the laterally shiftable connector provided with interior threads which coact with the threads upon said driver-sleeve, 47 is the anchored brake-plate or stationary support upon the axle and carrying the brake as hereinafter explained, and 52 is the anchoring device which engages said brake-plate and the frame of the bicycle to anchor the brake-plate against rotation, all, as thus far described, substantially as disclosed by said patent to Rockwell. Assuming that the brake-plate 47 supports a brake which is normally out of engagement with said hub 3 and that the brake-actuator 16 is so connected to such brake that backward rocking of said actuator causes said brake to engage the hub, it will be apparent that when the sprocket wheel 10 is driven forwardly by ordinary forward pedaling it rotates said driver-sleeve forwardly and thus causes said connector 19 to travel to the right until its clutch face 22 engages the corresponding clutch face 17 of the hub, whereupon continued forward rotation of the sprocket, the sleeve and the connector causes the hub 3 to rotate and the bicycle to be propelled; when the rider holds his feet stationary on the pedals and thus holds the driver-sleeve 11 stationary, the rotating hub causes the connector 19 to move to the left (on the threads of said driver sleeve) until the before mentioned clutching engagement is broken, whereupon the hub 3 is free to coast; and when the driver-sleeve 11 is rocked backwardly, as by backward rocking of the pedals, said connector 19 is shifted to the left until its clutch face 23 engages the clutch face 18 of the brake-actuator, whereupon further backward rocking of the driver-sleeve also rocks the brake-actuator backwardly and the brake is applied; all as is more fully disclosed by said patent to Rockwell.

In carrying out my invention the hub is provided at its end with a brake-drum 70 which extends outwardly beyond the said spoke flange $3^a$, and the brake-plate or support 47 has an inwardly extending flange 71 which receives and surrounds said brake-drum but is circumferentially spaced therefrom. The resilient, normally outwardly expanded brake-ring or band 72 lies between said flange 71 and said brake-drum 70, said flange preferably extending over the whole outer surface of the brake-ring to protect the latter and said flange also having its edge in close proximity to said spoke flange 3ª to prevent dirt and the like entering the space inclosed by said flange 71. If desired, the spoke flange can be thickened at its outer portion to provide a protecting rim 73 overlapping the flange 71 to further guard against the entrance of dirt.

A finger or lug 74 upon what may be termed the outer end of the brake-ring lies in the space between the brake-plate 47 and the adjacent end of the hub, while the other end of the brake-ring is held against free rotation, as by the rib 75 entering a groove 76 in the inner face of the flange 71. An operating lever 77, pivoted upon the stud 78 in said brake-plate, has one arm in engagement with said finger 74 while its other arm is received in the socket 43 in said brake-actuator. Thus, backward rocking of said brake-actuator rocks said lever, whereupon the said outer end of the brake-ring is forced forwardly, thus contracting the brake-ring about the brake-drum 70 of the hub and retarding or stopping the latter. As soon as the brake-actuator is relieved of braking pressure, the resiliency of the brake-ring causes it to expand against the flange 71, thus moving out of engagement with the brake-drum of the hub and leaving the latter free from braking influence, such expansion of the brake-ring also restoring the lever 77 and the brake-actuator to normal, inoperative position.

Preferably the brake-ring is provided at its inner edge with a circumferential rib or projection 79 which enters a corresponding groove 80 in the flange 71 in order to hold the brake-ring against lateral displacement. In this event the distance between the ends of the brake-ring is preferably great enough to permit the brake-ring to be so contracted that, notwithstanding said rib, said ring can be slid into the flange 71 and then permitted to expand into its assembled position shown in the drawings. Also, the rib 75 and groove 76, located near what may be termed the inner end of the brake-ring, are preferably provided with inclined faces, as shown at 81, so that, as the brake-ring is contracted, such inclined faces force even the said inner end of the brake-ring radially against the brake-drum 70, thus causing the whole inner face of the brake-ring to perform braking action. Furthermore said rib prevents twisting of the brake-ring when braking force is being applied. Thus, the brake is located outside of the hub and operates upon the exterior thereof, but the general structure of the said Rockwell coaster brake is not altered or interferred with, powerful and efficient braking action is secured, and the brake is housed and protected in a simple and convenient manner.

Of course, the braking mechanism would be equally effective as such if employed without mechanism for either driving or coasting.

Having thus described my invention, what I claim as new and desire to secure by Letters Patent is—

1. In a braking mechanism, a hub having a flange, a brake-drum for said hub and extending beyond said hub-flange, an anchoring member, a protecting flange upon said anchoring member of less internal circumference than said hub flange and extending toward said hub-flange and to a point adjacent thereto, said protecting flange lying about said brake-drum, and a brake between said protecting flange and said drum; substantially as described.

2. In a braking mechanism, a hub having a flange, a brake-drum for said hub and extending beyond said hub-flange, an anchoring member, a protecting flange upon said anchoring member and extending toward said hub-flange, said protecting flange lying about said brake-drum, a portion upon said hub-flange overlapping the edge of said protecting flange, and a brake between said protecting flange and said drum; substantially as described.

3. In a braking mechanism, a hub, a brake-drum therefor, an anchoring member, a flange upon said anchoring member and lying about said brake-drum, a brake between said flange and said drum, and interlocking parts upon said flange and said brake preventing lateral displacement of the latter; substantially as described.

4. In a braking mechanism, a hub, a brake-drum therefor, an anchoring member, a flange upon said anchoring member and lying about said drum, a brake-ring between said flange and said drum, means for applying force to one end of said ring to contract the latter, and coöperating parts upon said flange and the other end of said ring and having inclined faces for causing said other end of said ring to move toward said drum into braking engagement; substantially as described.

5. The combination with a hub, a brake-drum therefor, and a brake-actuator, of an anchored brake-plate at the end of said hub and spaced therefrom, a brake anchored to said plate and lying outside of said drum to coöperate with the latter, and operating connection between said actuator and said brake and lying in the said space between said hub and said plate; substantially as described.

6. The combination with a hub, a brake-drum therefor, and a brake-actuator, of an anchored brake-plate at the end of said hub and spaced therefrom, a brake anchored to said plate and lying outside of said drum to coöperate with the latter, a lug upon said brake and extending into said space between said hub and said plate, and operating connection between said actuator and said lug; substantially as described.

7. The combination with a hub, a brake-drum therefor, and a brake-actuator, of an anchored brake-plate at the end of said hub and spaced therefrom, a brake anchored to said plate and lying outside of said drum to coöperate with the latter, a lug upon said brake and extending into said space between said hub and said plate, and a lever pivotally supported upon said plate and having its respective arms operatively engaging said actuator and said lug; substantially as described.

8. The combination with a hub, a brake-drum therefor, an anchored brake-plate at the end of said hub and spaced from said end, a brake anchored to said plate and coöperating with said drum, an operating lug upon said brake at one side thereof and extending into said space between the end of said hub and said plate, means for engaging said lug to actuate said brake, and means for preventing lateral displacement of said brake; substantially as described.

9. The combination with a hub, a brake-drum therefor, an anchored brake-plate at the end of said hub and spaced from said end, a brake upon the outer side of said drum and coöperating therewith, said brake being anchored to said plate, an inwardly extending operating lug upon said brake at one side thereof and extending into said space between the end of said hub and said plate, means coöperating with said lug and applying its force toward the center of the drum for actuating said brake, and means for preventing lateral displacement of said brake; substantially as described.

10. The combination with a hub, a brake-drum therefor, an anchored brake-plate at the end of said hub and spaced therefrom, a brake anchored to said plate and coöperating with said drum, a flange upon said plate and overlapping said brake, an operating lug upon said brake at one side thereof and extending into said space between said hub and said plate, means for engaging said lug to actuate said brake, and interlocking parts upon said flange and said brake and extending across the latter; substantially as described.

11. The combination with a hub, a brake-drum therefor, an anchored brake-plate at the end of said hub and spaced therefrom, a brake anchored to said plate and coöperating with said drum, a flange upon said plate and overlapping said brake, an operating lug upon said brake at one side thereof and extending into said space between said hub and said plate, and interlocking parts upon said flange and said brake and extending across the latter, said interlocking parts being near the inner end of said brake and having coöperating inclined faces for forcing said end into braking engagement; substantially as described.

In testimony whereof, I hereunto affix my signature, in the presence of two witnesses.

GALES P. MOORE.

Witnesses:
W. E. WIGHTMAN,
IRA L. NEWCOMB.

---

Copies of this patent may be obtained for five cents each, by addressing the "Commissioner of Patents, Washington, D. C."

Correction in Letters Patent No. 1,113,367.

It is hereby certified that in Letters Patent No. 1,113,367, granted October 13, 1914, upon the application of Gales P. Moore, of Bristol, Connecticut, for an improvement in "Coaster-Brakes," an error appears in the printed specification requiring correction as follows: Page 3, line 17, for the word "lving" read *lying;* and that the said Letters Patent should be read with this correction therein that the same may conform to the record of the case in the Patent Office.

Signed and sealed this 10th day of November, A. D., 1914.

[SEAL.] R. F. WHITEHEAD,
*Acting Commissioner of Patents.*